9335X
W. Carpenter,
Corn Sheller.
Patented Jan. 23. 1836.
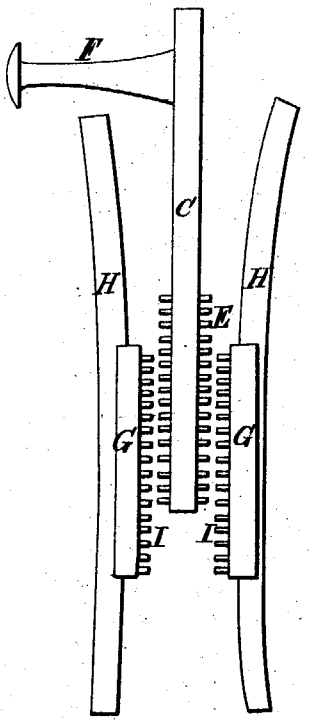
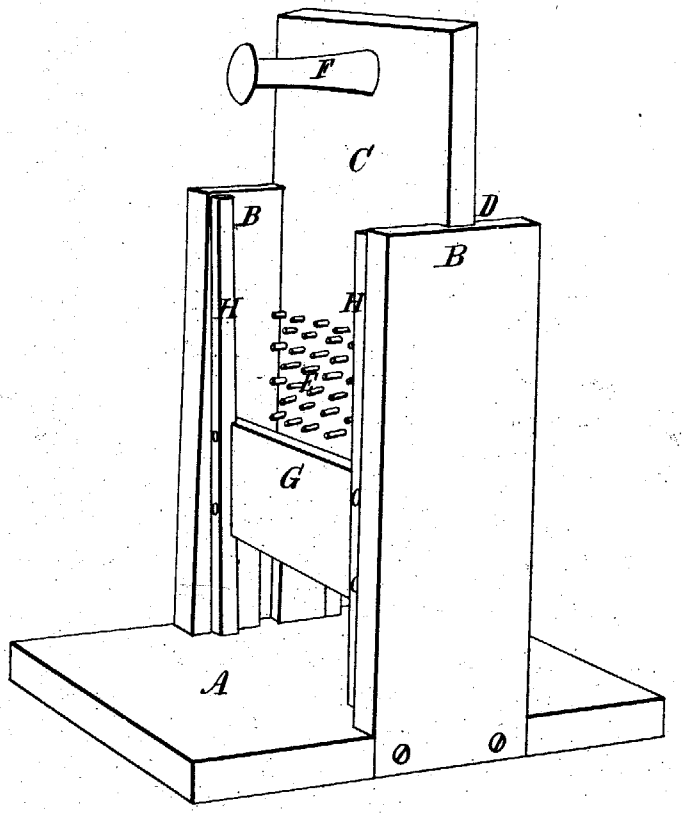

av. 14

Jan. 23. 1836

9335X

Warren Carpenter, of New Castle. Penn.

Letters Patent

The schedule referred to in these Letters Patent and making part of the same, containing a description in the words of the said Warren Carpenter himself, of his improvement in the machine for shelling corn.

Be it known that I Warren Carpenter of the Town of New Castle in the County of Mercer & State of Pennsylvania have made an improvement in the useful arts being a machine for shelling corn called Carpenters Corn Sheller, which is described as follows, reference being had to the annexed drawing of the same making part of this Specification - The machine consists of a platform or base A. upon which are erected two cheeks B between which works up and down a slide C. in grooves D cut in the cheeks, which slide has iron pins or points E driven into it on both sides for shelling the corn, and is worked by a F. inserted into it near the top - In front of the slide on each side is a bed G resting against springs H. secured to the cheeks; and in the face of the bed towards the slide are inserted pins or points I. similar to those in the slide for shelling the corn - The ears of corn are put between the slide and bed at top, the slide moved briskly up and down by hand, the corn being shelled by the pins in the slide and beds - The springs allowing the beds to accommodate themselves for larger or smaller ears of corn. What I claim as my invention and which I desire to secure by Letters Patent consists in the peculiar structure, combination and arrangement of parts of the before described machine for shelling corn -

Warren Carpenter

Witnesses

A. C. Semple

Joseph Emery

Drawing

M. G.

286 wds]